US012117299B2

(12) United States Patent
Peng et al.

(10) Patent No.: US 12,117,299 B2
(45) Date of Patent: Oct. 15, 2024

(54) DEMAND COVERAGE, SERVICE AND CAPACITY FULFILMENT ROUTE OPTIMIZATION

(71) Applicant: Hitachi, Ltd., Tokyo (JP)

(72) Inventors: Shouchun Peng, San Jose, CA (US); Ravigopal Vennelakanti, San Jose, CA (US); Ramyar Saeedi, Santa Clara, CA (US); Malarvizhi Sankaranarayanasamy, Mountain View, CA (US); Rahul Vishwakarma, Berkeley, CA (US); Prasun Singh, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 17/692,080

(22) Filed: Mar. 10, 2022

(65) Prior Publication Data
US 2023/0288212 A1    Sep. 14, 2023

(51) Int. Cl.
*G01C 21/34*    (2006.01)
*G06N 20/00*    (2019.01)

(52) U.S. Cl.
CPC ....... *G01C 21/343* (2013.01); *G01C 21/3423* (2013.01); *G01C 21/3492* (2013.01); *G06N 20/00* (2019.01)

(58) Field of Classification Search
CPC .............. G01C 21/343; G01C 21/3423; G01C 21/3492; G06N 20/00

USPC ......................................................... 701/533
See application file for complete search history.

(56) References Cited

U.S. PATENT DOCUMENTS

| 8,948,053 | B2* | 2/2015 | Kolavennu | H04L 45/02 370/255 |
| 9,350,643 | B2* | 5/2016 | Wang | H04L 45/125 |
| 9,880,017 | B2* | 1/2018 | Fowe | G08G 1/012 |
| 10,295,353 | B2* | 5/2019 | König | G08G 1/096833 |
| 11,599,846 | B2* | 3/2023 | Neumann | G01C 21/3691 |
| 11,972,390 | B1* | 4/2024 | Viswanathan | G06Q 10/04 |
| 2017/0323429 | A1 | 11/2017 | Godbaz et al. | |

* cited by examiner

*Primary Examiner* — Andrew Joseph Rudy
(74) *Attorney, Agent, or Firm* — Procopio, Cory, Hargreaves & Savitch LLP

(57) ABSTRACT

A method for a system. The method may include receiving information regarding a plurality of nodes of the transportation network, a map associated with the transportation network, and a current demand associated with multiple nodes in the transportation network. The method may further include generating, based on the received information, a demand grid related to the transportation network. The method may also include determining a set of service zones based on the received information and the generated demand grid. The method may further include generating, based on the received information and the set of service zones, a model for route optimization. The method may also include determining, based on the model, at least one candidate path for a vehicle associated with the on-demand transportation service.

20 Claims, 12 Drawing Sheets

DEMAND COVERAGE, SERVICE AND CAPACITY FULFILMENT ROUTE OPTIMIZATION

BACKGROUND

Field

The present disclosure is generally directed to route planning.

Related Art

Traditional route planning focuses on passenger side applications. Traditionally routes are calculated with journey planning applications like google maps and other commercial packages as shown in FIG. 1, which utilizes single objective (i.e., shortest distance) of routing algorithms to find route such as Dijkstra (single source to single destination), bellman ford algorithm (all pairs source and destination). For example, a traditional route planning may produce one of the route 101, the route 102, or the route 103 for a user 105. Although the simple path can be found and basic plan based on human intervention can be defined, the challenge in finding more than one objective remains. To find a route for the demand or service region the route plan must consider the demand signals, and other criterial. So far there are ways to derive a heuristic algorithm that can calculate optimized route using optimization methods, however making these decisions are NP-hard, meaning that these decision problems are unable to be solved in a reasonable amount of time (i.e., 1+years). Another challenge is the dynamicity of the problem, the main disadvantage from the current methods is that problem setting is static, while introducing realistic demand events that would require changes, or service condition change, the optimization plan for the decision needs to be re-calculate. However, when it comes to considering passenger demand and service fulfilments for transportation operators, current methods and system relies on rule-based routing function, that would lead to finding impaired solution or failed to consider a fulfillment plan.

SUMMARY

To provide a comprehensive plan based on the passenger demand and the current supply from the transportation options, this invention presents a demand oriented and service fulfilment dynamic routing system for transportation service planning that adapts transportation demand, service fulfilment and capacity in a transportation network and computes the optimal solution for the planning of a multimodal transportation service.

Example implementations described herein include an innovative method for a system. The method may include receiving information regarding a plurality of nodes of the transportation network, a map associated with the transportation network, and a current demand associated with multiple nodes in the transportation network. The method may further include generating, based on the received information, a demand grid related to the transportation network. The method may also include determining a set of service zones based on the received information and the generated demand grid. The method may further include generating, based on the received information and the set of service zones, a model for route optimization. The method may also include determining, based on the model, at least one candidate path for a vehicle associated with the on-demand transportation service.

Example implementations described herein include an innovative computer-readable medium storing computer executable code for a system. The computer executable code may include instructions for receiving information regarding a plurality of nodes of the transportation network, a map associated with the transportation network, and a current demand associated with multiple nodes in the transportation network. The computer executable code may also include instructions for generating, based on the received information, a demand grid related to the transportation network. The computer executable code may further include instructions for determining a set of service zones based on the received information and the generated demand grid. The computer executable code may also include instructions for generating, based on the received information and the set of service zones, a model for route optimization. The computer executable code may further include instructions for determining, based on the model, at least one candidate path for a vehicle associated with the on-demand transportation service.

Example implementations described herein include an innovative apparatus for a system. The apparatus may include a memory and at least one processor configured to receive information regarding a plurality of nodes of the transportation network, a map associated with the transportation network, and a current demand associated with multiple nodes in the transportation network. The at least one processor may also be configured to generate, based on the received information, a demand grid related to the transportation network. The at least one processor may further be configured to determine a set of service zones based on the received information and the generated demand grid. The at least one processor may also be configured to generate, based on the received information and the set of service zones, a model for route optimization. The at least one processor may further be configured to determine, based on the model, at least one candidate path for a vehicle associated with the on-demand transportation service,

DETAILED DESCRIPTION

Figure 1:
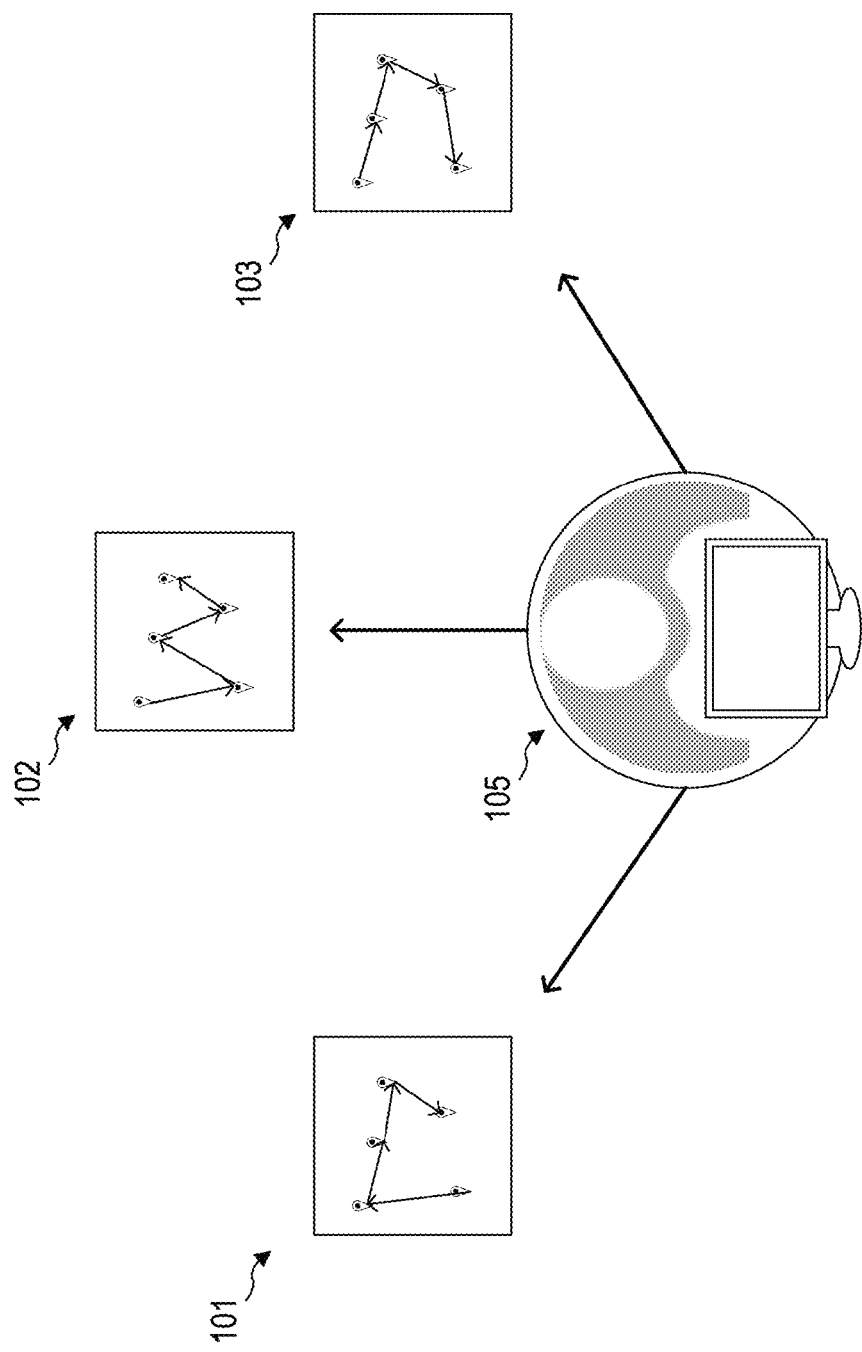
FIG. 1 illustrates a set of routes generated for a user.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein include an innovative method for a system. The method may include receiving information regarding a plurality of nodes of the transportation network, a map associated with the transportation network, and a current demand associated with multiple nodes in the transportation network. The method may further include generating, based on the received information, a demand grid related to the transportation network. The method may also include determining a set of service zones based on the received information and the generated demand grid. The method may further include generating, based on the received information and the set of service zones, a model for route optimization (or a plurality of models for route optimization). The method may also include determining, based on the model, at least one candidate path for a vehicle associated with the on-demand transportation service.

This disclosure relates to route planning and/or path planning using machine learning to learn a policy that can generate an optimized demand coverage, service, and/or capacity fulfilment route plan for a transportation service (e.g., an on-demand transportation service). Path finding is heavily invested in the passenger-side applications and not operator- or transportation service-side, where the transportation plan needs to be properly planned based on multiple objectives before the operation launch. For example, in such planning for the transportation service needs to compute (e.g., suggest or recommend) the route of the service, includes processing the demand, route plan based on service region, minimal/efficient travel distance and others.

In this disclosure, an example is provided related to a vehicle route planning problem where customer demand needs to be fulfilled by a transportation business. This kind of problem may be referred to as a demand responsive vehicle routing problem. More specifically, in some aspects, there are pockets of demand in different locations that are associated with one or more points of interest that travelers may desire to reach. In addition, the travelers may have travel preferences, such as time, mode of transportation, and so on. On the other hand, a transportation operator may desire to plan an optimal transportation plan based on demand, the plan may also consider what level of capacity would be the best for the business, how many routes a vehicle should hold, which stops in a service area to serve. In addition, the operator may have a limited fleet of vehicles, a capacity limit of the vehicles, and so on. The current disclosure discusses a method and apparatus for providing transportation solution planning that can balance the transportation supply and the passenger demand. Moreover, the method and apparatus may provide better route options for the transportation service design.

Figure 2:
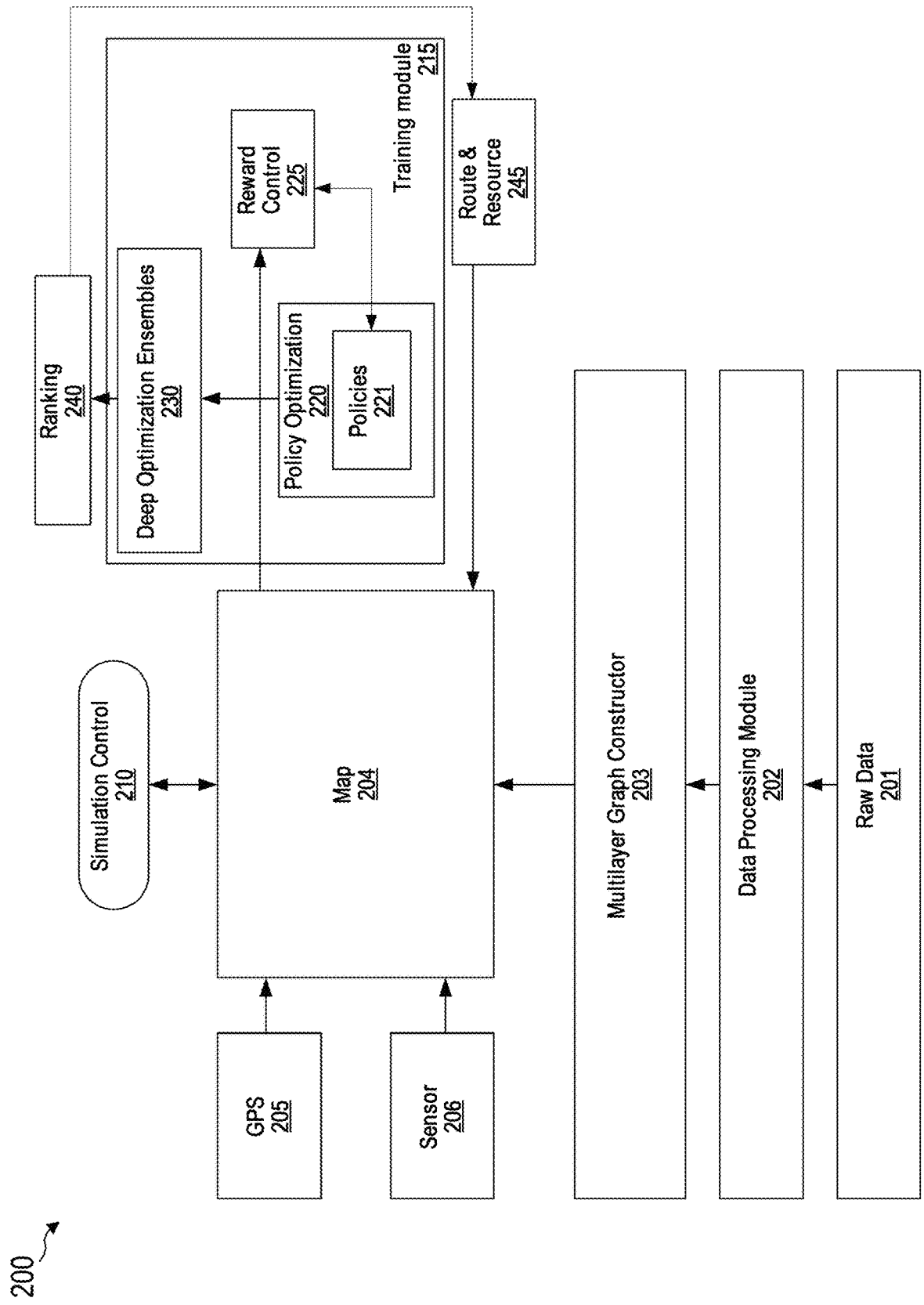
FIG. 2 illustrates an example system in accordance with some aspects of the present disclosure.

FIG. 2 illustrates an example system 200 in accordance with some aspects of the present disclosure. The system 200, in some aspects, gathers raw data 201 regarding a multi-modal transportation network. In some aspects, the raw data may include one or more of input map data, route data, stop data, trip data, demand data, origin-destination matrix data, service zone data, and/or fleet information. The data processing module 202, in some aspects, processes the raw data 201 (e.g., the input data) for harmonization and aggregation.

The raw data processed by the data processing module 202 may be passed to a multilayer graph constructor 203. The multilayer graph constructor 203 may receive the processed data and, in some aspects, may generate graph structures (e.g., a multilayer graph) and associate elements of the graph structures with attributes (route, trip, stop, service zone, demand, etc.) identified in, or by, the processed data. The graph structure along with GPS data 205 and sensor data 206 may be used to generate a map 204.

To calculate the optimized route, in some aspects, the system 200 may train an optimized model for finding the demand coverage, service, and/or capacity fulfilment route. For the training phase, the system may use real data (e.g., raw data 201) or simulated data (e.g., simulated data generated by simulation control 210) for one or more of a demand horizon, a traffic condition in each of a set of service zones, a current route fulfilment, and/or a resource availability. In some aspects, the system 200 (e.g., via simulation control 210) utilizes these data sources to construct the environment for the training. The environment for the training may include an identified set of service zones associated with historical or simulated demand, service capacity, stops, trips, routes, etc.

A training module 215, in some aspects, may train a set of policies 221 in a policy optimization module 220 based on the environment for training. Each policy may be based on a set of rewards (e.g., optimization targets, costs, benefits, etc.) stored in a reward control module 225. The policies may be trained to optimize for different route characteristics, e.g., shortest route, fewest stops, shortest time, fewest routes to provide service coverage, or other characteristics defined by a user. The policies, in some aspects, may be policies for finding the demand coverage that may be trained based on possible scenarios that take into account one or more of a demand horizon, a passenger origin/destination matrix, a set of traffic condition, service zones, vehicle capacity, vehicle occupancy, and fleet resources. The training module 215 may provide the trained policies to a deep optimization ensembles 230 that provides, to each trained policy, a same input (e.g., a current or historical data set). Each policy may generate a recommendation regarding one or more routes for the multi-modal transportation network and a ranking module 240 may rank the generated routes and provide a set of the routes to a route and resource module 245. The routes provided to the route and resource module 245 may be a most highly ranked route or a set of a configured number of the most-highly ranked routes.

Figure 3:
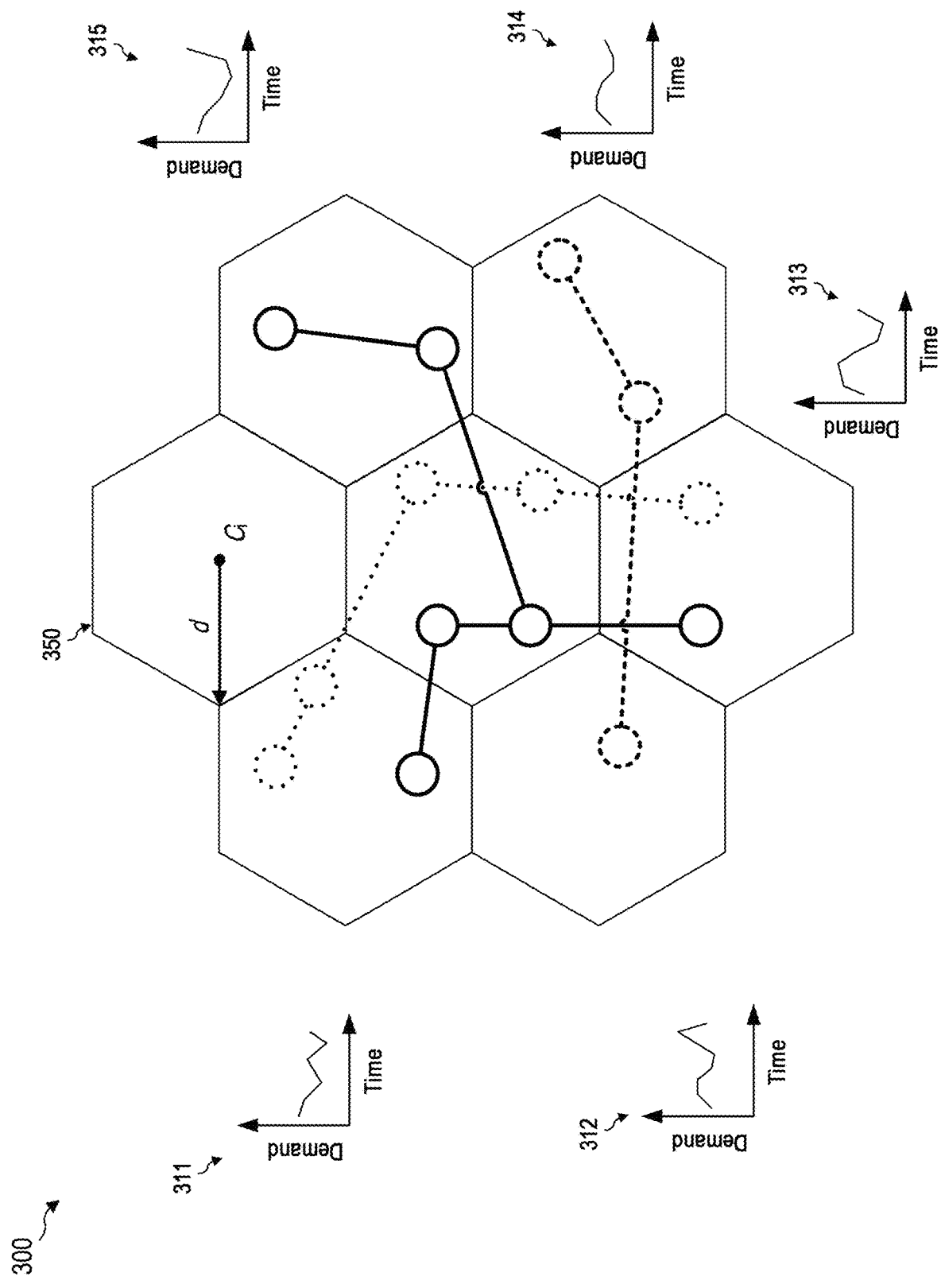
FIG. 3 is a diagram illustrating an example of service zones and a network graph that may be generated by a multilayer graph constructor in accordance with aspects of the present disclosure.

FIG. 3 is a diagram 300 illustrating an example of service zones and a network graph that may be generated by a multilayer graph constructor 203 in accordance with aspects of the present disclosure. Diagram 300 indicates a set of similarly-defined (e.g., having a same size and shape) service zones such as service zone 350. Each service zone may include a set of stops connected by links that may define a route within or across a set of service zones. In some aspects, each service zone or node (e.g., stop, origin, destination, etc.) may be associated with a demand curve (e.g., demand curve 311, 312, 313, 314, or 315) that indicates a demand at that service zone or stop over time. The demand curve may represent demand over time for a sufficient time to train each policy based on a value function associated with the data and the policy. The network graph may further associate each service zone or node of the network graph with attributes of the different modes of transportation.

Figure 4:
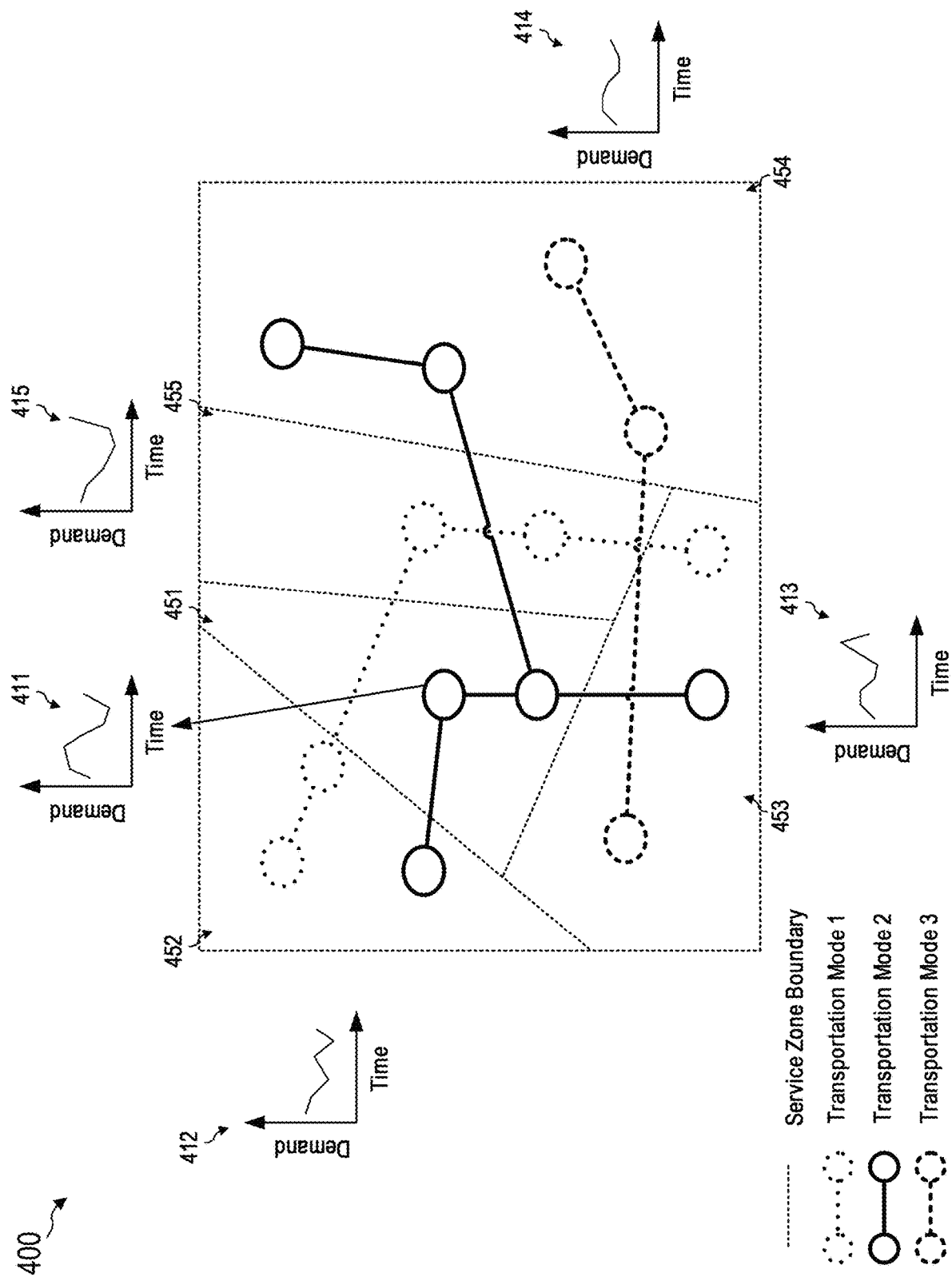
FIG. 4 is a diagram illustrating an example of service zones and a network graph that may be generated by a multilayer graph constructor in accordance with aspects of the present disclosure.

FIG. 4 is a diagram 400 illustrating an example of service zones and a network graph that may be generated by a multilayer graph constructor 203 in accordance with aspects of the present disclosure. Diagram 400 indicates a set of differently-defined (e.g., having a different size and/or shape) service zones 451, 452, 453, 454, and 455. Each service zone may include a set of stops connected by links that may define a route within or across a set of service zones. In some aspects, each service zone or node (e.g., stop, origin, destination, etc.) may be associated with a demand curve (e.g., demand curve 411, 412, 413, 414, or 415) that indicates a demand at that service zone or stop over time. The demand curve may represent demand over time for a sufficient time to train each policy based on a value function associated with the data and the policy. The network graph may further associate each service zone or node of the network graph with attributes of the different modes of transportation.

Figure 5:
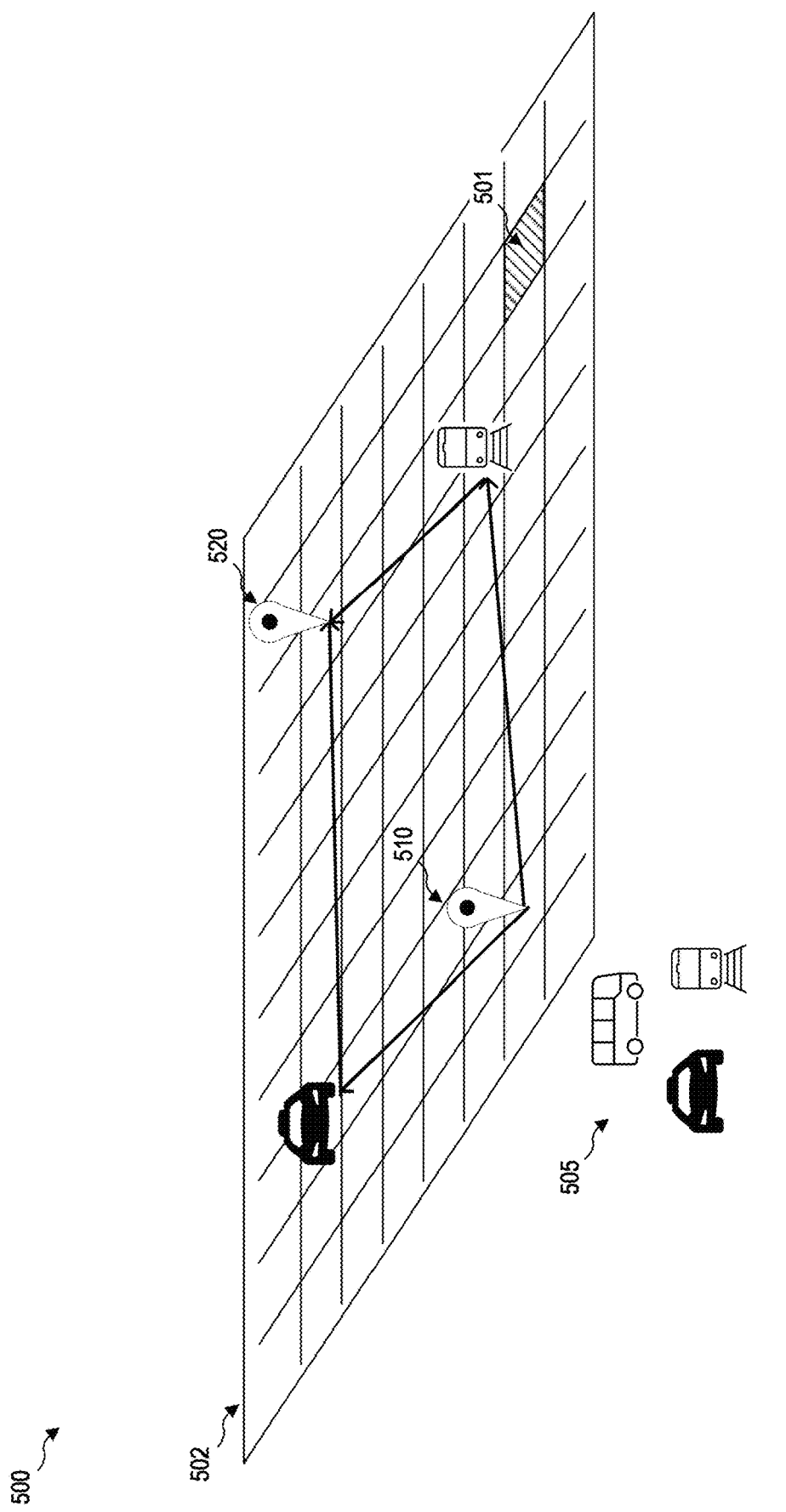
FIG. 5 is a diagram, illustrating a map area (or service zone) divided into a grid of smaller areas (e.g., grid area) for the map area and/or service zone.

FIG. 5 is a diagram 500, illustrating a map area (or service zone) divided into a grid of smaller areas (e.g., grid area 501) for the map area and/or service zone. Diagram 500 includes a set of different modes of transportation 505 for a service area 502. An origin 510 and a destination 520 may be defined within the generated grid and a set of possible multi-modal or single-mode) routes may be identified for the origin/destination pair defined within the generated grid. For example, the diagram 500 may relate to a use case of on demand transportation. In some aspects, the transportation services may operate in a target service area (e.g., service area 502) that includes multimodal transportation options (e.g., the set of different modes of transportation 505). Operators of the different modes of transportation may need to consider the routing plan based on the local area passenger demand, service coverage, and/or other performance metrics for a given origin-to-destination transport demand path for operation. To determine a route plan, the system, in some aspects, may perform a route plan selection that may dynamically assign one or more routes based on the modal option and transportation network demand. To determine an efficient route, the system may provide a set of ranked route plan(s) for the transportation operator to plan the operation including the transportation mode, vehicle capacity, fleet resources, traffic demand/condition, demand in the service area, and route consideration.

Figure 6:
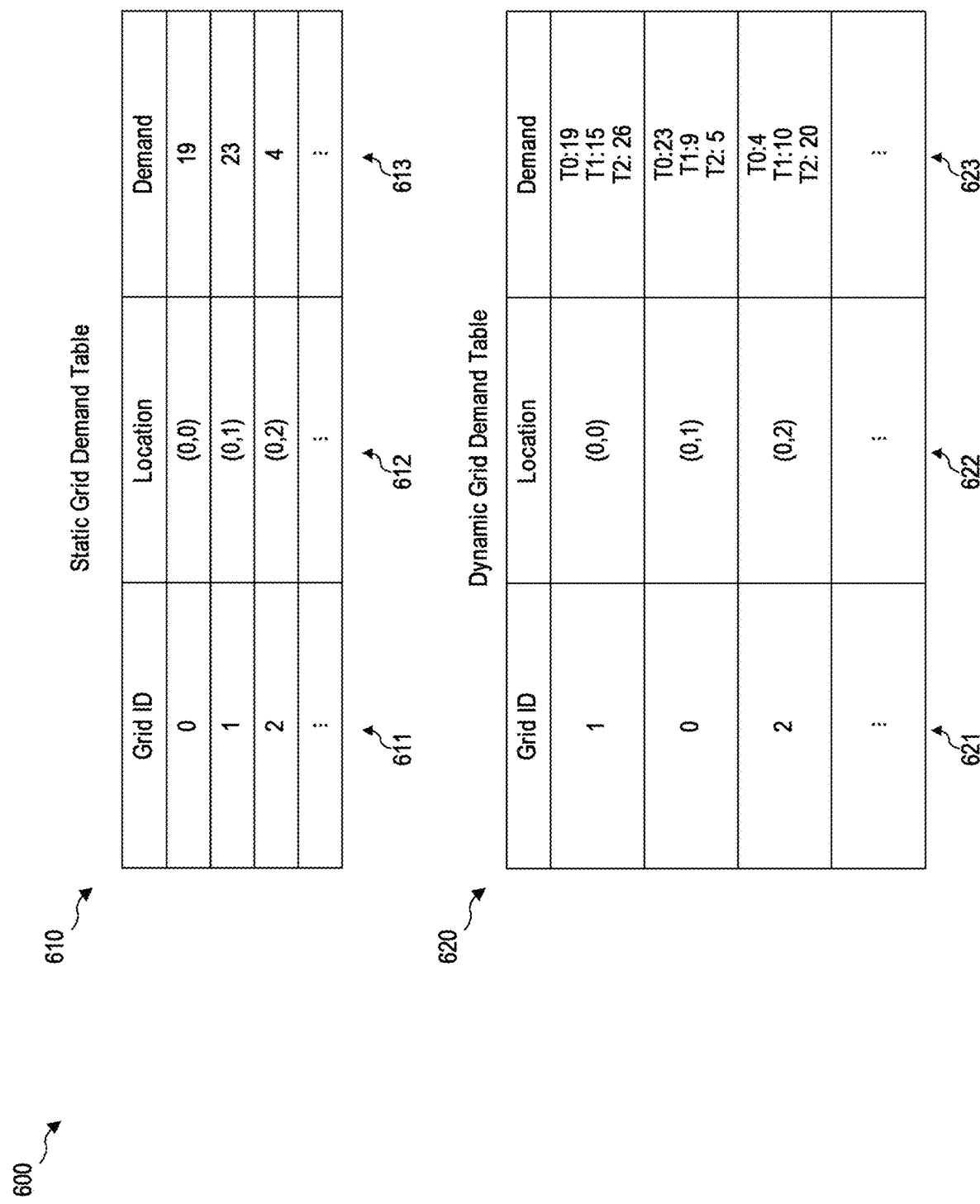
FIG. 6 is a diagram illustrating a static grid demand table and a dynamic grid demand table.

FIG. 6 is a diagram 600 illustrating a static grid demand table 610 and a dynamic grid demand table 620. Static grid demand table 610, in some aspects, includes information regarding a grid area identifier 611, a location (e.g., coordinates) of the grid area 612, and a demand 613 associated with the grid area. Similarly, dynamic grid demand table 620, in some aspects, includes information regarding a grid area identifier 621, a location (e.g., coordinates) of the grid area 622, and a demand 623 associated with the grid area for each of a set of times (e.g., T0, T1, and T2).

Figure 7:
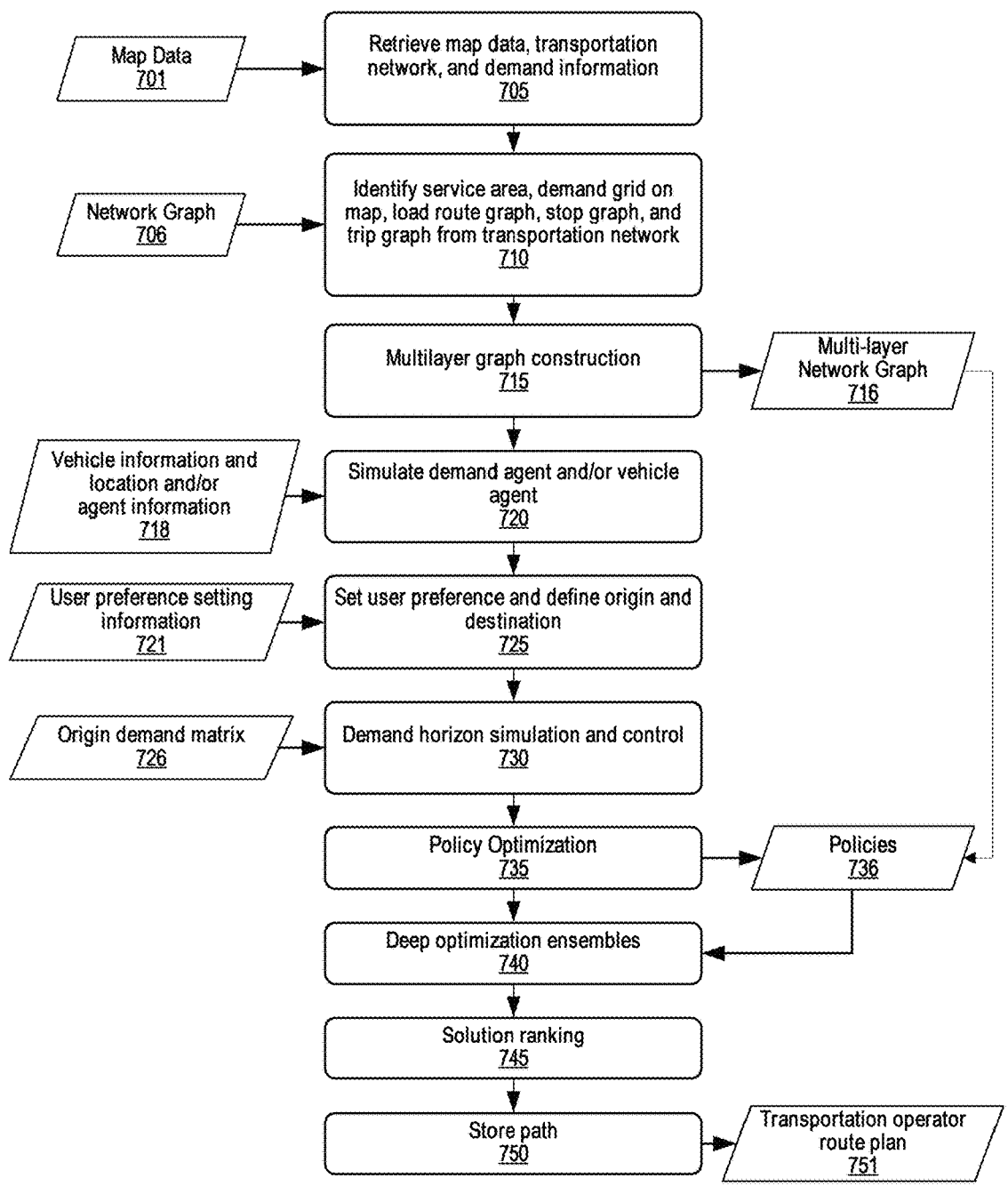
FIG. 7 is a flow diagram illustrating a set of operations for generating a solution to a demand-responsive vehicle routing problem.

FIG. 7 is a flow diagram 700 illustrating a set of operations for generating a solution to a demand-responsive vehicle routing problem. A system (e.g., system 200 of FIG. 2), at 705, may retrieve map data, transportation network, and demand information. For example, map data 701 may include map data, information regarding a transportation network, and demand information. The system, at 710, may identify, based on network graph data 706, a service area, a demand grid on a map, a load route graph, a stop graph, and a trip graph. At 715, the system may construct (or generate) a multi-layer network graph 716 based on the service area, the demand grid, the load route graph, the stop graph, and the trip graph.

The system, in some aspects, may simulate, at 720, a demand agent and/or a vehicle agent. In some aspects, the simulation at 720 may be based on a set of vehicle information and location and/or agent information 718. The simulation, in some aspects, may be skipped based on having historical data sufficient to train a set of policies in a subsequent operation. The system may, at 725, set one or more user preferences and define at least one origin/destination pair. The one or more user preferences may be based on user preference setting data information 721. The user preference setting data may include preferences such as a waiting time threshold, a maximum number of modes of transportation for a route.

At 730, the system may define a demand horizon simulation and control based on an origin demand matrix 726. The demand horizon simulation and control may be used to define a set of parameters for a demand-responsive vehicle routing problem. The set of parameters for the demand-responsive vehicle routing problem may be provided to a policy optimization operation 735. The policy optimization operation 735, in some aspects, may generate a set of policies 736.

In the optimization phase, an optimization module may take the simulation environment and retrieve a value function for the designated time horizon based on the user definition. For each step, the optimization module may update an agent's transportation capacity based on the demand (e.g., an influx/outflux), a transportation location, an available fleet and calculate a reward associated with the step. At the end of each step, the optimization module may update the network, the value function, an action table and a reward function. In some aspects, the optimization module may utilize a demand graph network generated at the multilayer graph construction operation 715 instead of simulated data generated at 720 (e.g., simulate demand agent and/or vehicle agent). The system may use the demand graph network as input and compute the subsequent steps.

In the execution module, when receiving a request for the demand coverage, service, and capacity fulfilment route, the generated models (or policies 736) may be used to produce (or generate) one or more routes including a sequenced set of stops as an output. The generated models (or the produced one or more routes) may be used as input for a deep optimization ensemble operation 740 to calculate all possible scenarios for route selection. Based on the output of the deep optimization ensemble operation 740, the system may perform a solution ranking operation 745. The solution ranking operation 745 may include calculating a rank for each route produced in the deep optimization ensemble operation 740 based on a ranking function. The ranking function, in some aspects, may be based on the user-defined set of parameters for the demand-responsive vehicle routing problem. Based on the solution ranking operation 745, in some aspects, the system may calculate the final route ranking based on the transportation service profile. The system may choose, as part of the solution ranking operation 745, the set of routes(s) based on an optimized objective output (e.g., associated with a value function). For example, the system may determine a transportation plan solution=R, where R is a sequence of route(s) for each transportation options T_i where T_i:{r i=(r_(k_i) . . . r_(t_i))i, i=1, 2, 3 . . . ; [r_k, r] _t∈V}. The transportation plan solution (R) may be determined such that a demand associated with an area of interest is satisfied and may optimize for one or more of a capacity, a profit, or a service coverage. The workflow may further include storing, at 750, the chosen set of routes and providing a transportation operator route plan 751 to a transportation operator.

Figure 8:
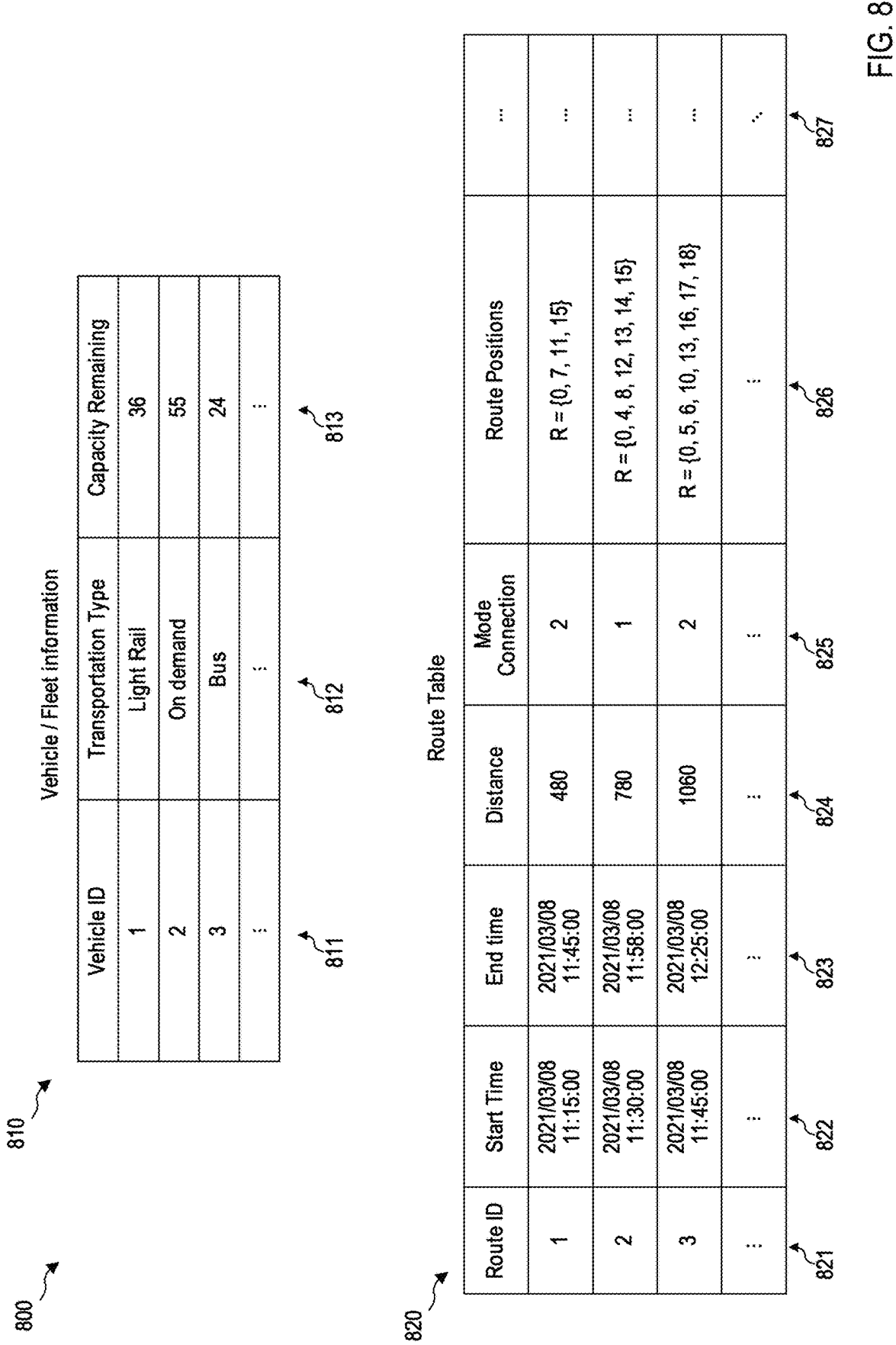
FIG. 8 is a diagram illustrating a vehicle/fleet information table and a route table.

FIG. 8 is a diagram 800 illustrating a vehicle/fleet information table 810 and a route table 820. Vehicle/fleet information table 810, in some aspects, includes information regarding a vehicle identifier 811, a transportation type 812 associated with the vehicle, and a remaining capacity 813 associated with the vehicle. Route table 820, in some aspects, may include information regarding a route identified 821, a start time 822, an end time 823, a distance 824, a mode connection 825, a set of route positions 826, and a set of additional fields 827.

Figure 9:
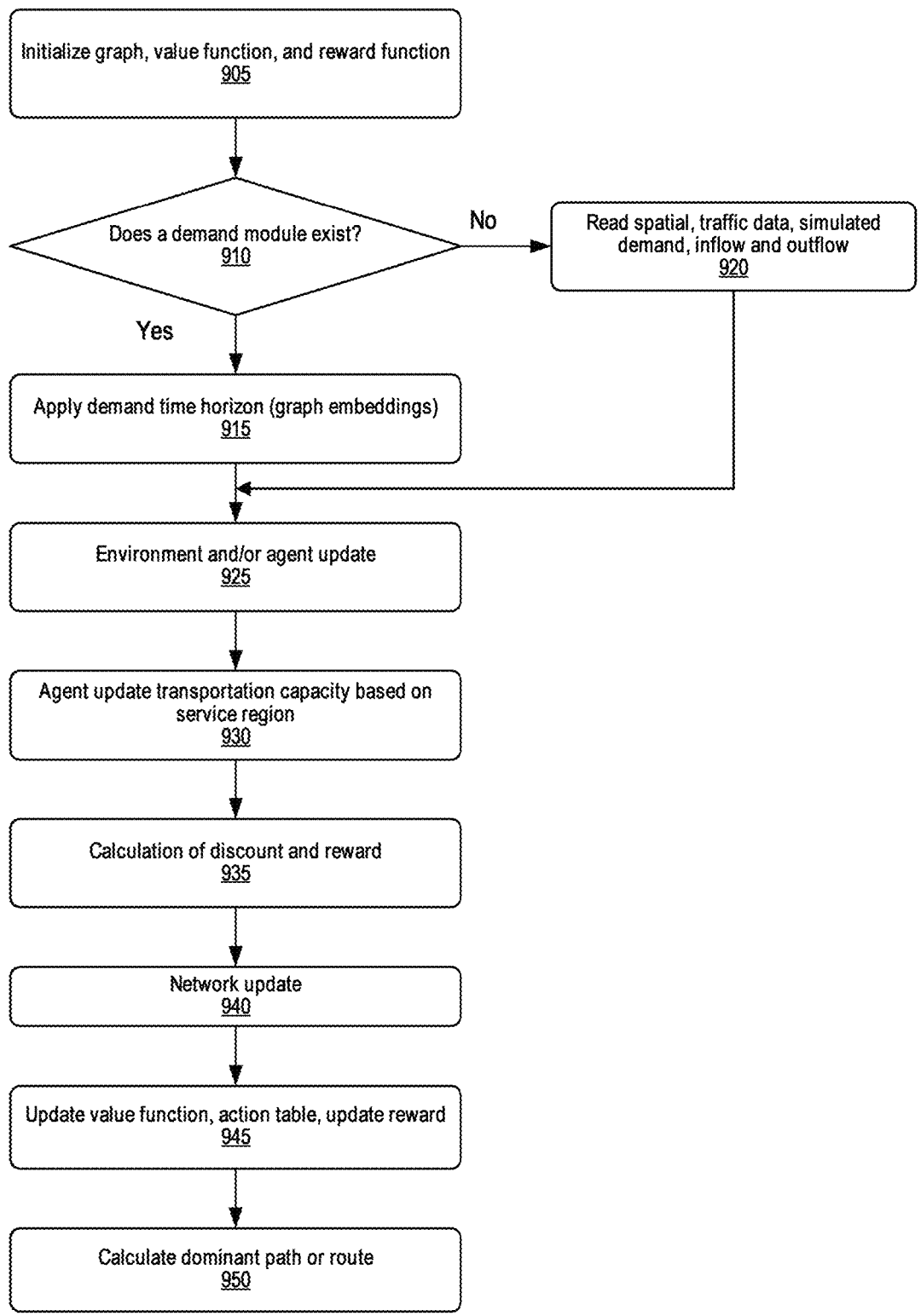
FIG. 9 is a diagram illustrating a workflow for an optimization module for finding a best model (or policy) for generating a set of routes.

FIG. 9 is a diagram 900 illustrating a workflow for an optimization module for finding a best model (or policy) for generating a set of routes. The workflow may begin, at 905, by initializing (receiving) a network graph, one or more value functions (e.g., for each of a set of characteristics), and/or one or more reward functions. At 910, the workflow may include determining whether a demand module exists. An existing demand module may be based on existing and/or historical data. If the demand module is determined to exist, the workflow may include applying, at 915, a demand time horizon (e.g., applying a defined set of parameters for a demand-responsive vehicle routing problem).

However, if the demand module is determined not to exist at 910, the workflow may include, at 920, reading spatial data, traffic data, simulated demand, and/or data regarding inflows and outflows. In some aspects, based on the spatial data, traffic data, simulated demand, and/or data regarding inflows and outflows, the system may generate a simulated demand module. Based on one of the existing demand module or the simulated demand module the workflow may include updating an environment and/or an agent at 925.

The workflow may further include, at 930, an agent updating a transportation capacity based on a service region. For example, based on a demand module for a particular service region, a transportation capacity may be updated for the particular service region. The operations at 925 and 930 may identify a set of routes. The workflow may include calculating, at 935, a discount and reward associated with each route in the set of routes. The workflow may also include updating the network at 940 based on the identified set of routes and the calculated discount and reward.

Based on the updated network, the workflow may include, at 945, updating the value function, an action table, and a reward associated with the network. The workflow may include, after updating the value function, the action table, and the reward associated with the network at 945, calculating a dominant path and/or route at 950. The dominant path and/or route may be a path and/or route in the set of routes associated with a highest value calculated by a value function or a reward.

Figure 10:
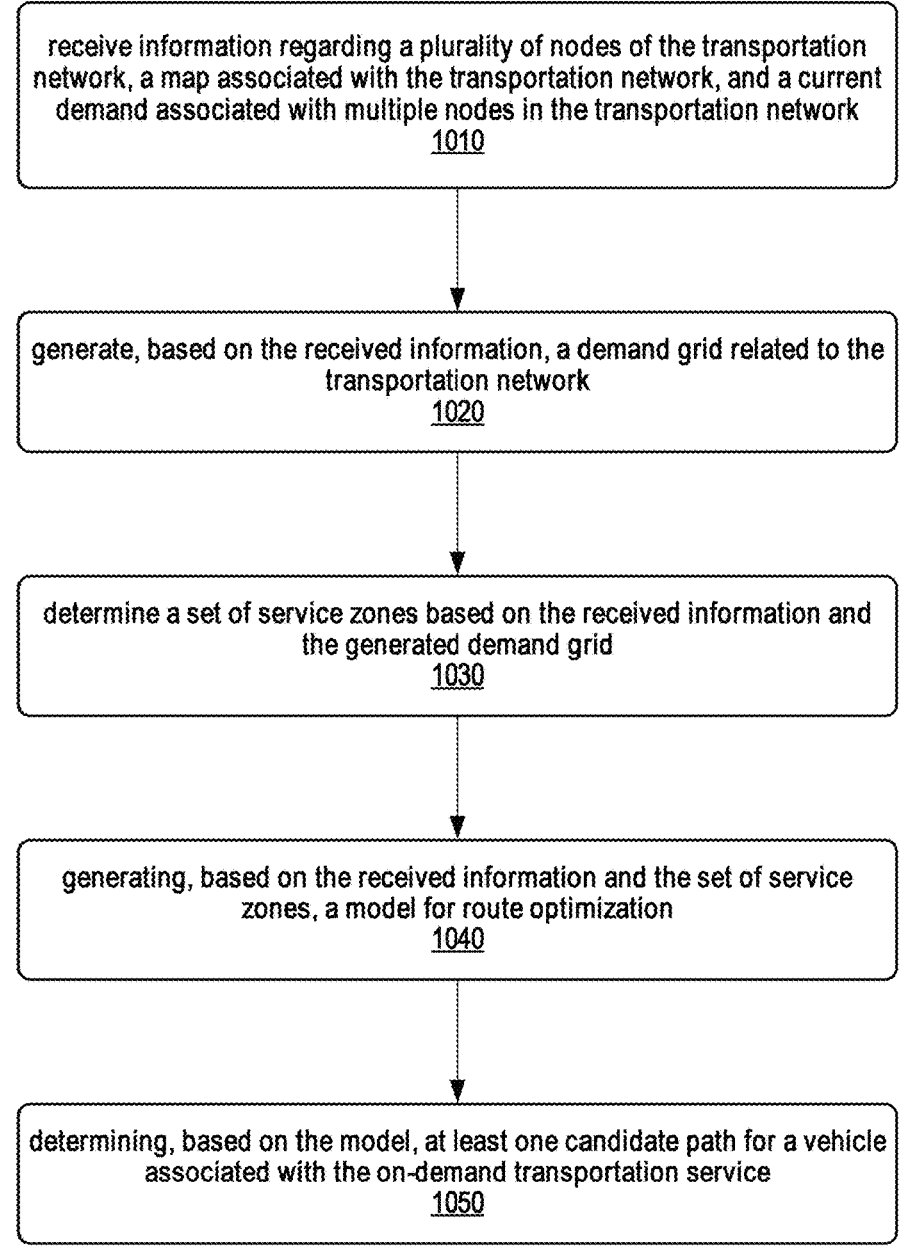
FIG. 10 is a flow diagram illustrating a method of solving a demand-responsive vehicle routing problem.

FIG. 10 is a flow diagram 1000 illustrating a method of solving a demand-responsive vehicle routing problem. The method may be performed by a system (e.g., system 200). At 1010, the system may receive information regarding a plurality of nodes of the transportation network, a map associated with the transportation network, and a current demand associated with multiple nodes in the transportation network. In some aspects, the information regarding the multiple nodes of the transportation network comprises information regarding a plurality of stops and trips. The transportation network, in some aspects, includes a plurality of subnetworks associated with different modes of transportation and the information regarding the plurality of nodes of the transportation network includes information regarding each of the plurality of subnetworks. Based on the plurality of networks, the system may generate a network graph for the transportation network representing a set of features of the different modes of transportation. For example, referring to FIGS. 2-4, the data processing module 202 of the system 200 may receive raw data 201 (e.g., information regarding a plurality of nodes of the transportation network) and may generate a multimode network graph for the transportation network using multilayer graph constructor 203.

At 1020, the system may generate, based on the received information (e.g., received information regarding a prior distribution or based on a prior distribution), a demand grid related to the transportation network. The demand grid may identify different grid areas and associated demands and capacities associated with each grid area. For example, referring to FIGS. 2, 5, and 6, the system 200 may generate a demand grid for a service area 502 and associate each grid area, e.g., grid area 501, with a static grid demand table 610 or a dynamic grid demand table 620 including a set of attributes such as a grid area identifier 611 or 621, the location (e.g., coordinates) of the grid area 612 or 622, and a demand 613 associated with the grid area or a demand 623 associated with the grid area for each of a set of times (e.g., T0, T1, and T2).

At 1030, the system may determine a set of service zones based on the received information and the generated demand grid. In some aspects, determining the set of service zones at 1030 is further based on one or more of information regarding vehicle locations for each of a plurality of modes of transportation associated with the transportation network, information regarding vehicle capacity for each of the plurality of modes of transportation associated with the transportation network, or information regarding a service coverage for each of the plurality of modes of transportation associated with the transportation network. For example, referring to FIGS. 2, 3, and 4, the system 200 may determine a set of service zones 350 or service zones 451-455 based on the raw data 201 and/or a multilayer network graph generated by multilayer graph constructor 203.

At 1040, the system may generate, based on the received information and the set of service zones, a model for route optimization. In some aspects, generating the model for route optimization may further be based on one or more of simulated demand data based on prior distribution or parameter setting of the simulation or historical demand data. The simulated data or the historical data, in some aspects, may relate to one or more of a demand horizon, a passenger origin and destination matrix, a traffic condition, a set of possible service zones, a set of vehicle capacities, a set of vehicle occupancies, and a set of fleet resources. In some aspects, generating the model for route optimization includes training a machine-learning-based model using one or more of the simulated demand data or the historical demand data to generate a plurality of candidate policies for finding a demand coverage, a service coverage, and a capacity fulfilment route. In some aspects, the system may receive a set of user preferences, and generating, at 1040, the model for route optimization is further based on the received set of user preferences. The set of user preferences may include a maximum allowable wait time. For example, referring to FIGS. 2 and 7, the system 200, or more specifically the training module 215 may perform a policy optimization operation 735 to generate a set of policies (e.g., models) 221 or 736.

Finally, at 1050, the system may determine, based on the model, at least one candidate path for a vehicle associated with the on-demand transportation service. The on-demand transportation service, in some aspects, may be one of the different modes of transportation and the at least one candidate path is determined based on at least one additional mode of transportation of the different modes of transportation. In some aspects, the at least one candidate path includes a plurality of candidate paths generated based on a plurality of candidate policies. Each of the plurality of candidate paths, in some aspects, may be associated with a value indicating an efficiency of the candidate path that is assigned by the trained machine-learning-based model. For example, referring to FIGS. 2 and 7, the system 200 may generate a set of candidate paths (e.g., routes) using deep optimization ensembles 230 at the deep optimization ensemble operation 740 and assign, using the ranking module 240 to perform solution ranking operation 745 a value to the candidate paths.

Figure 11:
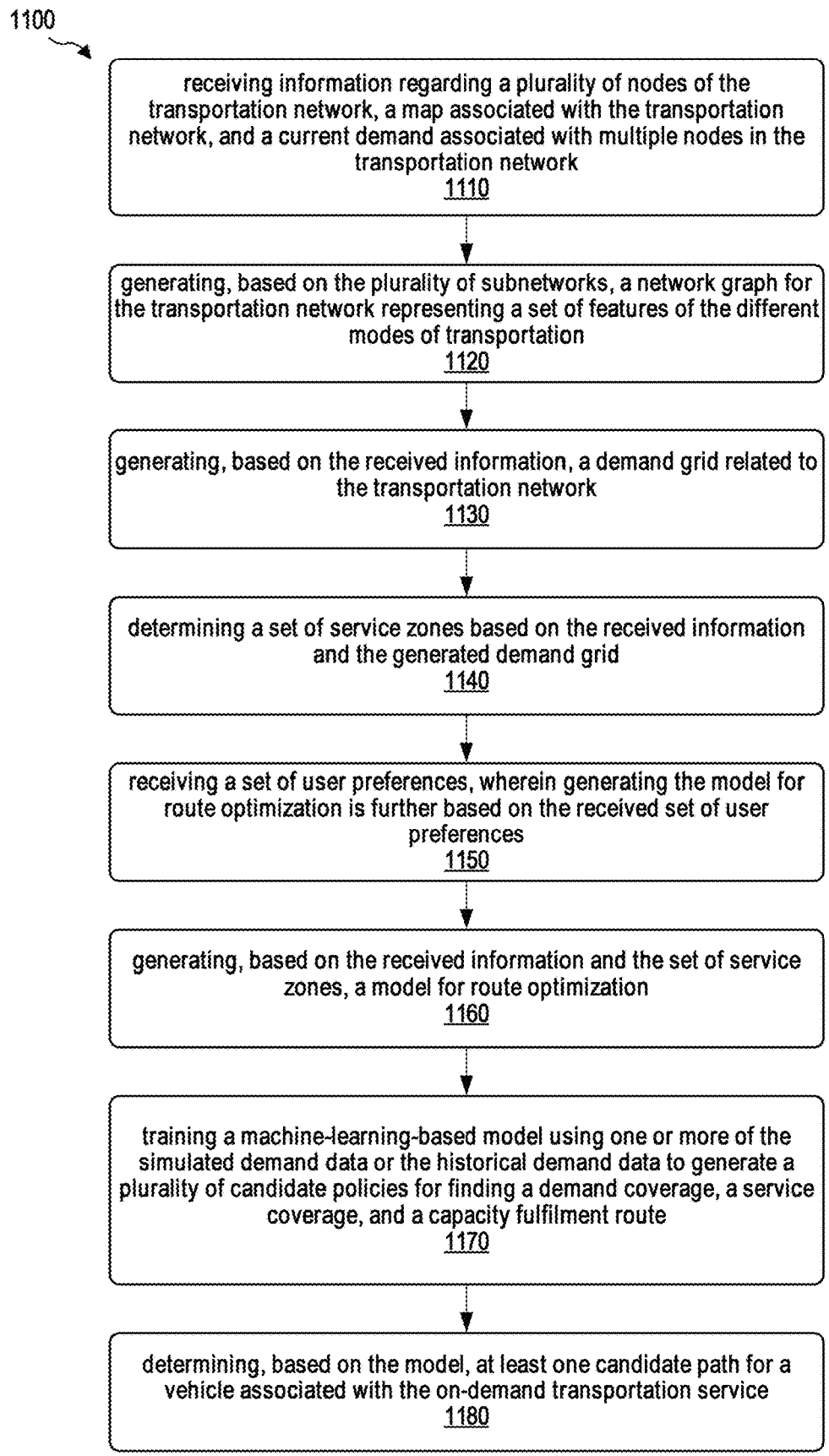
FIG. 11 is a flow diagram illustrating a method of solving a demand-responsive vehicle routing problem.

FIG. 11 is a flow diagram 1100 illustrating a method of solving a demand-responsive vehicle routing problem. The method may be performed by a system (e.g., system 200). At 1110, the system may receive information regarding a plurality of nodes of the transportation network, a map associated with the transportation network, and a current demand associated with multiple nodes in the transportation network. In some aspects, the information regarding the multiple nodes of the transportation network comprises information regarding a plurality of stops and trips. The transportation network, in some aspects, includes a plurality of subnetworks associated with different modes of transportation and the information regarding the plurality of nodes of the transportation network includes information regarding each of the plurality of subnetworks. For example, referring to FIGS. 2-4, the data processing module 202 of the system 200 may receive raw data 201 (e.g., information regarding a plurality of nodes of the transportation network).

At 1120, the system may generate, based on the plurality of networks, a network graph for the transportation network representing a set of features of the different modes of transportation. The set of features, in some aspects, may include stops, links, assets, or other features of the different modes of transportation. For example, referring to FIGS. 2-4, the data processing module 202 of the system 200 may process the raw data 201 (e.g., information regarding a plurality of nodes of the transportation network) using data processing module 202 and may generate a multimode network graph for the transportation network using multilayer graph constructor 203.

At 1130, the system may generate, based on the received information (e.g., information regarding a prior distribution or based on a prior distribution), a demand grid related to the transportation network. The demand grid may identify different grid areas and associated demands and capacities associated with each grid area. For example, referring to FIGS. 2, 5, and 6, the system 200 may generate a demand grid for a service area 502 and associate each grid area, e.g., grid area 501, with a static grid demand table 610 or a dynamic grid demand table 620 including a set of attributes such as a grid area identifier 611 or 621, the location (e.g., coordinates) of the grid area 612 or 622, and a demand 613 associated with the grid area or a demand 623 associated with the grid area for each of a set of times (e.g., T0, T1, and T2).

At 1140, the system may determine a set of service zones based on the received information and the generated demand grid. In some aspects, determining the set of service zones at 1130 is further based on one or more of information regarding vehicle locations for each of a plurality of modes of transportation associated with the transportation network, information regarding vehicle capacity for each of the plurality of modes of transportation associated with the transportation network, or information regarding a service coverage for each of the plurality of modes of transportation associated with the transportation network. For example, referring to FIGS. 2, 3, and 4, the system 200 may determine a set of service zones 350 or service zones 451-455 based on the raw data 201 and/or a multilayer network graph generated by multilayer graph constructor 203.

At 1150, the system may receive a set of user preferences. The set of user preferences may include a maximum allowable wait time. For example, referring to FIGS. 2 and 7, the system 200 may receive user preference setting information 721 and may set, at 725, one or more user preferences and define at least one origin/destination pair.

At 1160, the system may generate, based on the received information and the set of service zones, a model for route optimization. In some aspects, generating the model for route optimization may further be based on one or more of simulated demand data based on prior distribution or parameter setting of the simulation or historical demand data. The simulated data or the historical data, in some aspects, may relate to one or more of a demand horizon, a passenger origin and destination matrix, a traffic condition, a set of possible service zones, a set of vehicle capacities, a set of vehicle occupancies, and a set of fleet resources. In some aspects, generating the model for route optimization includes training a machine-learning-based model using one or more of the simulated demand data or the historical demand data to generate a plurality of candidate policies for finding a demand coverage, a service coverage, and a capacity fulfilment route. In some aspects, the model for route optimization is further based on the set of user preferences received at 1150. For example, referring to FIGS. 2 and 7, the system 200, or more specifically the training module 215 may perform a policy optimization operation 735 to generate a set of policies (e.g., models) 221 or 736.

At 1170, the system may train a machine-learning-based model using one or more of the simulated demand data or the historical demand data to generate a plurality of candidate policies (or models) for finding a demand coverage, a service coverage, and/or a capacity fulfilment route. The system, in some aspects, may train multiple machine-learning-based models (or policies) using different methodologies. The multiple machine-learning-based models (or policies) may be included in an ensemble of models that may each produce a solution for a demand-responsive vehicle routing problem. For example, referring to FIGS. 2 and 7, the system 200 may include a training module 215 that trains a plurality of policies as part of a policy optimization operation 735.

Finally, at 1180, the system may determine, based on the model, at least one candidate path for a vehicle associated with the on-demand transportation service. The on-demand transportation service, in some aspects, may be one of the different modes of transportation and the at least one candidate path is determined based on at least one additional mode of transportation of the different modes of transportation. In some aspects, the at least one candidate path includes a plurality of candidate paths generated based on a plurality of candidate policies. Each of the plurality of candidate paths, in some aspects, may be associated with a value indicating an efficiency of the candidate path that is assigned by the trained machine-learning-based model. For example, referring to FIGS. 2 and 7, the system 200 may generate a set of candidate paths (e.g., routes) using deep optimization ensembles 230 at the deep optimization ensemble operation 740 and assign, using the ranking module 240 to perform solution ranking operation 745 a value to the candidate paths.

The method and apparatus discussed above may involve finding an underserved demand area in a service region and balancing the resource allocation for fleet management. For example, by using the system, the operator can increase the utilization of the fleet. Also, the method and apparatus may allow an operator may efficiently operate in a higher demand area.

Each of the aspects and examples described above may be combined with each other. While examples of an apparatus and methods are described above they do not limit the subject matter of this disclosure. Other modes considered to fall within the technical scope of the novel apparatus and methods are also covered by the present disclosure. Moreover, the novel apparatus and methods may not include all of the details explained in relation to the examples above. Furthermore, control lines and information lines are illustrated to the extent required for explaining the novel apparatus and methods, and not all control lines and information lines required for the product may necessarily be indicated. In effect, it may be understood that nearly all of the configurations are mutually connected.

Figure 12:
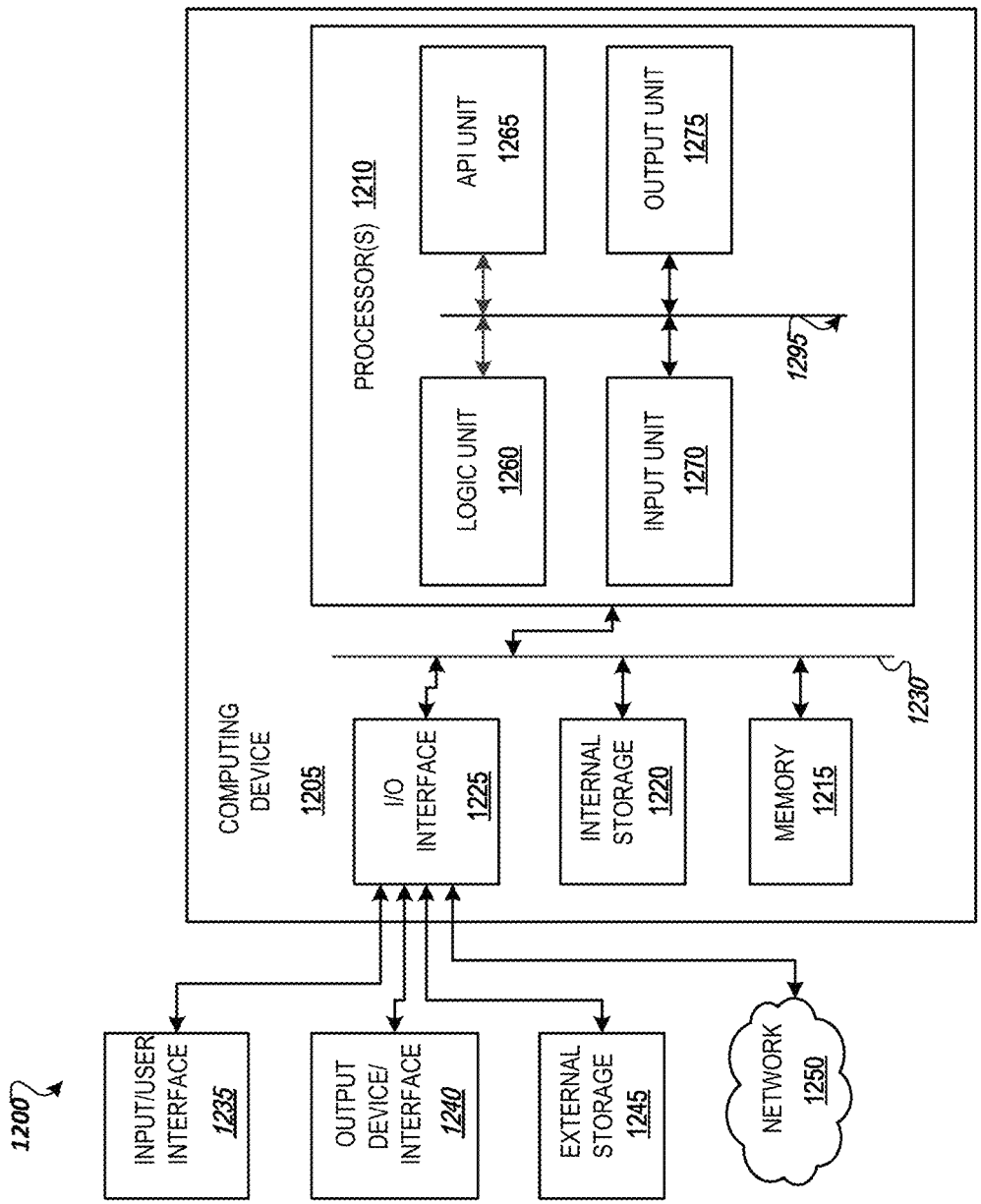
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processors 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205.

In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, virtual reality (VR) devices, radios, and the like), and devices not designed for mobility (e.g., desktop computers, other computers, VR devices, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include but is not limited to, wired and/or wireless interfaces using any communication or 10 protocols or standards (e.g., Ethernet, 1202.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs), graphics processing units (GPUs), or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to receive information regarding a plurality of nodes of the transportation network, a map associated with the transportation network, and a current demand associated with multiple nodes in the transportation network. The processor(s) 1210 may also be configured to generate, based on the received information, a demand grid related to the transportation network. The processor(s) 1210 may further be configured to determine a set of service zones based on the received information and the generated demand grid. The processor(s) 1210 may further be configured to generate, based on the received information and the set of service zones, a model for route optimization. The processor(s) 1210 may also be configured to determine, based on the model, at least one candidate path for a vehicle associated with the on-demand transportation service. The processor(s) 1210 may also be configured to generate, based on the plurality of subnetworks, a network graph for the transportation network representing a set of features of the different modes of transportation. The processor(s) 1210 may also be configured to receive a set of user preferences, where generating the model for route optimization is further based on the received set of user preferences.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed:

1. A method for planning a route for an on-demand transportation service in a transportation network, the method comprising:

receiving information regarding a plurality of nodes of the transportation network, a map associated with the transportation network, and a current demand associated with multiple nodes in the transportation network;

generating, based on the information, a demand grid related to the transportation network, wherein the demand grid is a dynamically updated representation that reflects real-time demand across different nodes in the transportation network;

determining a set of service zones based on the information and the demand grid, wherein the service zones are dynamically adjusted geographical regions within the transportation network, categorized by varying levels of demand;

generating, based on the information, the dynamic demand grid, and the set of service zones, a model for route optimization that utilizes a machine learning algorithm that has been trained to predict optimal routes for vehicles in real-time to reduce travel time and increase efficiency based on real-time demand data; and determining, based on the model, at least one candidate path for a vehicle associated with the on-demand transportation service based on the route optimization model, wherein the candidate path is dynamically adjusted according to real-time updates from the demand grid and service zones, ensuring that the route is optimized for current demand patterns and service efficiency.

2. The method of claim 1, wherein the information regarding the multiple nodes of the transportation network comprises information regarding a plurality of stops and trips.

3. The method of claim 1, wherein the transportation network comprises a plurality of subnetworks associated with different modes of transportation and the information regarding the plurality of nodes of the transportation network comprises information regarding each of the plurality of subnetworks, the method further comprising:

generating, based on the plurality of subnetworks, a network graph for the transportation network representing a set of features of the different modes of transportation.

4. The method of claim 3, wherein the on-demand transportation service is one of the different modes of transportation and the at least one candidate path is determined based on at least one additional mode of transportation of the different modes of transportation.

5. The method of claim 1, further comprising:
receiving a set of user preferences, wherein generating the model for route optimization is further based on the set of user preferences.

6. The method of claim 5, wherein the set of user preferences comprises a maximum allowable wait time.

7. The method of claim 1, wherein determining the set of service zones is further based on one or more of information regarding vehicle locations for each of a plurality of modes of transportation associated with the transportation network, information regarding vehicle capacity for each of the plurality of modes of transportation associated with the transportation network, or information regarding a service coverage for each of the plurality of modes of transportation associated with the transportation network.

8. The method of claim 1, wherein generating the model for route optimization is further based on one or more of simulated demand data or historical demand data, the simulated demand data or the historical demand data relating to one or more of a demand horizon, a passenger origin and destination matrix, a traffic condition, a set of possible service zones, a set of vehicle capacities, a set of vehicle occupancies, and a set of fleet resources.

9. The method of claim 8, wherein generating the model for route optimization comprises training a machine-learning-based model using one or more of the simulated demand data or the historical demand data to generate a plurality of candidate policies for finding a demand coverage, a service coverage, and a capacity fulfilment route.

10. The method of claim 9, wherein the at least one candidate path comprises a plurality of candidate paths generated based on the plurality of candidate policies and wherein each of the plurality of candidate paths is associated with a value indicating an efficiency of the candidate path that is assigned by the machine-learning-based model.

11. The method of claim 9, wherein the at least one candidate path comprises a plurality of candidate paths for a plurality of service zones in the set of service zones generated based on the plurality of candidate policies and wherein each of the plurality of candidate paths is associated with a value indicating an efficiency of the candidate path that is assigned by the machine-learning-based model.

12. A system for planning a route for an on-demand transportation service in a transportation network, the system comprising:

a memory; and a set of processors coupled to the memory, the set of processors configured to:

receive information regarding a plurality of nodes of the transportation network, a map associated with the transportation network, and a current demand associated with multiple nodes in the transportation network;

generate, based on the information, a demand grid related to the transportation network, wherein the demand grid is a dynamically updated representation that reflects real-time demand across different nodes in the transportation network;

determine a set of service zones based on the information and the demand grid, wherein the service zones are dynamically adjusted geographical regions within the transportation network, categorized by varying levels of demand;

generate, based on the information, the dynamic demand grid, and the set of service zones, a model for route optimization that utilizes a machine learning algorithm that has been trained to predict optimal routes for vehicles in real-time to reduce travel time and increase efficiency based on real-time demand data; and determine, based on the model, at least one candidate path for a vehicle associated with the on-demand transportation service based on the route optimization model, wherein the candidate path is dynamically adjusted according to real-time updates from the demand grid and service zones, ensuring that the route is optimized for current demand patterns and service efficiency.

13. The system of claim 12, wherein the information regarding the multiple nodes of the transportation network comprises information regarding a plurality of stops and trips.

14. The system of claim 12, wherein the transportation network comprises a plurality of subnetworks associated with different modes of transportation and the information regarding the plurality of nodes of the transportation network comprises information regarding each of the plurality of subnetworks, the set of processors further configured to:

generate, based on the plurality of subnetworks, a network graph for the transportation network representing a set of features of the different modes of transportation, wherein the on-demand transportation service is one of the different modes of transportation and the at least one candidate path is determined based on at least one additional mode of transportation of the different modes of transportation.

15. The system of claim 12, the set of processors further configured to:
receive a set of user preferences, wherein generating the model for route optimization is further based on the set of user preferences.

16. The system of claim 15, wherein the set of user preferences comprises a maximum allowable wait time.

17. The system of claim 12, wherein determining the set of service zones is further based on one or more of information regarding vehicle locations for each of a plurality of modes of transportation associated with the transportation network, information regarding vehicle capacity for each of the plurality of modes of transportation associated with the transportation network, or information regarding a service coverage for each of the plurality of modes of transportation associated with the transportation network.

18. The system of claim 12, wherein generating the model for route optimization is further based on one or more of simulated demand data or historical demand data, the simulated demand data or the historical demand data relating to one or more of a demand horizon, a passenger origin and destination matrix, a traffic condition, a set of possible service zones, a set of vehicle capacities, a set of vehicle occupancies, and a set of fleet resources.

19. The system of claim 18, wherein generating the model for route optimization comprises training a machine-learning-based model using one or more of the simulated demand data or the historical demand data to generate a plurality of candidate policies for finding a demand coverage, a service coverage, and a capacity fulfilment route, and wherein the at least one candidate path comprises a plurality of candidate paths generated based on the plurality of candidate policies and wherein each of the plurality of candidate paths is associated with a value indicating an efficiency of the candidate path that is assigned by the machine-learning-based model.

20. The system of claim 19, wherein the at least one candidate path comprises a plurality of candidate paths for a plurality of service zones in the set of service zones generated based on the plurality of candidate policies and wherein each of the plurality of candidate paths is associated with a value indicating an efficiency of the candidate path that is assigned by the machine-learning-based model.

* * * * *